United States Patent
Park

(10) Patent No.: US 11,360,702 B2
(45) Date of Patent: Jun. 14, 2022

(54) CONTROLLER EVENT QUEUES

(71) Applicant: HEWLETT-PACKARD DEVELOPMENT COMPANY, L.P., Spring, TX (US)

(72) Inventor: Stanley Hyojun Park, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/480,979

(22) PCT Filed: Dec. 11, 2017

(86) PCT No.: PCT/US2017/065591
§ 371 (c)(1),
(2) Date: Jul. 25, 2019

(87) PCT Pub. No.: WO2019/117854
PCT Pub. Date: Jun. 20, 2019

(65) Prior Publication Data
US 2020/0301608 A1    Sep. 24, 2020

(51) Int. Cl.
*G06F 3/06* (2006.01)
(52) U.S. Cl.
CPC .......... *G06F 3/0659* (2013.01); *G06F 3/0604* (2013.01); *G06F 3/0673* (2013.01)
(58) Field of Classification Search
CPC .... G06F 3/0659; G06F 3/0604; G06F 3/0673; G06F 9/542; G06F 9/546; G06F 9/48
See application file for complete search history.

(56) References Cited

U.S. PATENT DOCUMENTS

| | | | |
|---|---|---|---|
| 3,949,369 A | 4/1976 | Churchill | |
| 5,872,938 A * | 2/1999 | Williams | G06F 16/9024 710/112 |
| 5,937,200 A | 8/1999 | Frid et al. | |
| 5,937,423 A * | 8/1999 | Robinson | G06F 3/0607 365/52 |
| 6,131,131 A | 10/2000 | Bassman et al. | |
| 6,219,742 B1 | 4/2001 | Stanley | |
| 6,253,260 B1 * | 6/2001 | Beardsley | G06F 3/0659 710/39 |
| 6,442,631 B1 * | 8/2002 | Neufeld | G06F 13/18 710/264 |

(Continued)

OTHER PUBLICATIONS

Love, Robert. Linux Kernel Development. Sep. 18, 2003. Sams. 1st Edition. Sample Chapter 3, The Linux Process Scheduler. (Year: 2003).*

(Continued)

*Primary Examiner* — Yaima Rigol
(74) *Attorney, Agent, or Firm* — Brooks, Cameron & Huebsch PLLC

(57) ABSTRACT

The examples include methods and apparatuses to store events in a queue for an EC, Storing events in a queue for an EC can include receiving a message from a core FW of an EC and identifying an event corresponding to the message. Storing events in a queue for an EC can also include accessing a priority associated with the event and adding the event and the priority to a queue to be processed by the EC.

13 Claims, 6 Drawing Sheets

(56) References Cited

U.S. PATENT DOCUMENTS

| | | | | |
|---|---|---|---|---|
| 6,496,950 B1* | 12/2002 | Zhao | ................ | G11C 15/00 |
| | | | | 714/718 |
| 6,745,262 B1* | 6/2004 | Benhase | ............. | G06F 9/4881 |
| | | | | 710/36 |
| 7,973,957 B2 | 7/2011 | Dodge et al. | | |
| 8,291,436 B2 | 10/2012 | Avasthi et al. | | |
| 8,307,440 B1 | 11/2012 | Canion et al. | | |
| 9,069,592 B2 | 6/2015 | Raisch et al. | | |
| 9,270,686 B1 | 2/2016 | Canion et al. | | |
| 2007/0260777 A1* | 11/2007 | Timpe | ............. | G06F 13/4059 |
| | | | | 710/52 |
| 2008/0235480 A1* | 9/2008 | Traister | ............. | G06F 9/30043 |
| | | | | 711/167 |
| 2008/0276049 A1 | 11/2008 | Kajigaya | | |
| 2012/0226842 A1* | 9/2012 | Evans | ................ | G06F 13/26 |
| | | | | 710/264 |
| 2017/0300269 A1* | 10/2017 | Um | ................ | G06F 3/0659 |
| 2018/0060065 A1* | 3/2018 | Lai | ............. | G06F 8/71 |

OTHER PUBLICATIONS

Bil Array.
Embedded software development in research enviroment; A practical guide for non-experts.

* cited by examiner

CONTROLLER EVENT QUEUES

BACKGROUND

Systems and devices utilize an embedded controller (EC) and/or a super input output (SIO). The EC and/or the SIO can handle many activities and/or events. The EC and/or the SIO can be advanced configuration and power interface (ACPI) compliant.

DETAILED DESCRIPTION

Figure 1:
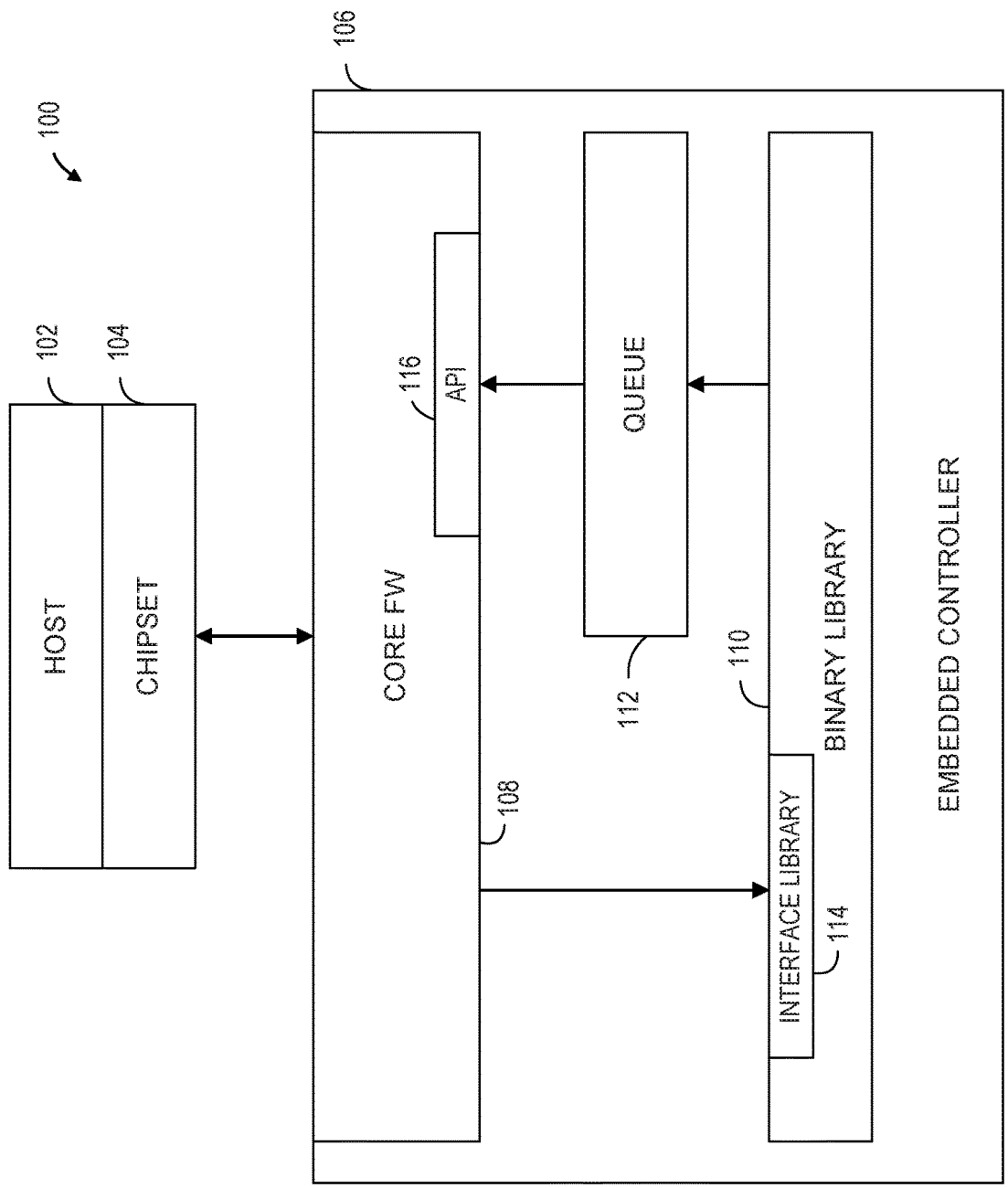
FIG. 1 illustrates an example of a system handling events using an EC.

Advanced configuration and power interface (ACPI) embedded controller (EC) chips can include EC and/or super input output (SIO) (e.g., input output controller). The EC and/or the SIO can be ACPI compliant. The EC and/or the SIO can handle various system tasks that the operating system (OS) does not handle or selects not to handle.

For example, the EC and/or the SIO can receive and process signals from a keyboard and/or other input sources. The EC and/or SIO can also turn a system (e.g., computing device) on and/or off, control access to an A20 line, control thermal measurements, control fans, control indicator light-emitting diodes (LEDs), manage batteries and/or battery charges, manage remote diagnostics, perform device resets, and/or control a watchdog timer. The EC and/or the SIO can also manage peripheral devices such as disks, printers, embedded controllers and/or keyboard controllers. The EC and/or the SIO can also manage ports and interfaces such as basic input/output system (BIOS) read only memory (ROM) interfaces, game ports, and/or music instrument digital interface (MIDI) ports among other components that can be managed and/or controlled by the EC and/or the SIO.

Although the examples described herein are provided in terms of the EC, the examples are also applicable to the SIO. For examples, the example of the flow diagram shown in FIG. 3 describes a flow of the EC which can also be applicable to describe a flow of the SIO. As such, the terms EC and SIO are used interchangeably herein and references to the EC can also include references to the SIO.

The EC can handle many activities. For example, the EC can generate events that can be processed to turn off a system and generate messages in the OS, among other activities/events that can be handled by the EC. The EC can be accessible to components external to the EC through an interface described as a core firmware (FW). The EC can also handle security features associated with generating the events through a binary library.

In some examples, the binary library may comprise source code that is not accessible. That is, the binary library can provide security features and/or operations that are made available to the EC and/or the core FW without providing access to the source code used to implement the security features and/or operations. As such, the binary library can provide an interface library which can be used by the core FW to provide communications from the core FW to the binary library.

The source code may be made unavailable given that the binary library, the core FW, and/or the EC may be provided by one or more parties. For example, the binary library may be provided by a first party while the core FW is provided by a third party. As such, the core FW can be a third-party core FW.

In some examples, the source code can be provided by the core FW and/or a party who provided the core FW and incorporated into the binary library to handle (e.g., process) the events. However, some events should be handled by the core FW and not by the binary library to avoid possible conflicts with the core FW functionalities. The handling of the events can be performed by the core FW to provide for a consistent handling of the events.

In some examples, the binary library and/or a provider of the binary library can provide the source code to the core FW to incorporate the source code into the core FW. However, incorporating the source code into the core FW can pass responsibility of the security features and/or operations to the core FW which may be undesirable given that it may be beneficial to limit the distribution of the source code to enhance security. Also, providing responsibility of the security features to the core FW may add complexity to the core FW. For example, the core FW may be responsible for calling specific functions, calls, and/or commands on the binary library for the library to be able to perform a number of operations associated with the security features. The core FW would be responsible for the timing of the calling of the functions, calls, and/or commands which could negatively impact the binary libraries ability to perform enforce the security features and/or operations.

Also, providing the source code to the core FW can include generating source code for all possible parties that provide the core FW. The stability of such source code may be unreliable and/or the complexity of providing individualized source code to the core FWs provided by a plurality of providers can be undesirable.

The examples described herein can implement a generic interface library that can be utilized by any core FW without adding complexity. Such a generic interface library can maintain reliability by retaining control of the security features and/or operations within the generic interface library. Implementing the generic interface library in the binary library can withhold direct access to the source code from the core FW and/or the EC.

The combination of the generic interface with a queue can allow the binary library to generate events and can allow the core FW to extract the events from the queue without exposing the source code used to generate the events. The queue can be uniquely implemented to include priority information and event data such that the core FW can extract the events without interacting with the binary library. For example, after providing a message and/or a call to the binary library, the core FW may process any events generated by the binary library and stored in the queue without providing additional messages and/or calls to the binary library.

The figures herein follow a numbering convention in which the first digit corresponds to the drawing figure number and the remaining digits identify an element or component in the drawing. For example, reference numeral 112 may refer to element "12" in FIG. 1 and an analogous element may be identified by reference numeral 212 in FIG. 2. Elements shown in the various figures herein can be added, exchanged, and/or eliminated to provide a number of additional examples. In addition, the proportion and the relative scale of the elements provided in the figures are intended to illustrate the examples described, and should not be taken in a limiting sense.

FIG. 1 illustrates an example of a system 100 handling events using an EC consistent with the disclosure. The system 100 can include a host 102, a chipset 104, and an EC 106.

The host 102 can be a source of messages from which events can be generated. The host 102 can be an OS or a BIOS. The chipset 104 can be components in an integrated circuitry that manages the data flow between the processor, the memory, and peripherals. For example, the chipset 104 can manage a flow of data between the host 102 and the EC 106. As such, the chipset 104 can be coupled to the EC 106 and can be in communication with the host 102.

The host 102 can include a core FW 108, a binary library 110, and a queue 112. The binary library 110 includes at least the interface library 114. In some examples, the host 102 can generate and provide messages, data, and/or information to the core FW 108 through the chipset 104. For example, an application executed in the OS can generate a message. The message can be provided to the OS (e.g., host 102). The OS can provide the message to the core FW 108 through the chipset 104.

The core FW 108 can include an application programming interface (API) 116 which can be utilized to access the queue 112. The core FW 108 can process received messages, data, and/or information to extract security related information and/or commands. The core FW 108 can provide the security related information and/or commands to the binary library 110. The binary library 110 can receive the security related information and/or commands at the interface library 114.

The binary library 110 can comprise FW that is part of the EC 106. The binary library 110 can be provided by a party that is different than a party that provides the core FW 108 and/or the EC 106.

The binary library 110 can be a hidden layer which is accessible through the interface library 114. A hidden layer can include code that is not accessible by other components. For example, the core FW 108 can have access to methods, objects, and/or classes implemented in the interface library 114 without having access to the remainder of the binary library 110. As such, the binary library 110 can be hidden from the core FW 108 except for the interface library 114.

The binary library 110 can process the security related information and/or commands received by the interface library 114. Based on processing the security related information and/or commands, the binary library 110 can generate a number of events. The events can be associated with the security related information and/or commands. The binary library 110 can store the events in the queue 112.

The queue 112 can comprise registers and/or memory that can be specifically used to store event data. That is, the queue 112 may not be used to store other types of data other than event data. The queue 112 can be, for example, a plurality of memory cells that are local to the EC 106. The queue 112 can be a bit array of memory cells. The memory cells can be physically addressed and/or virtually addressed. For example, the memory cells can be consecutively addressed memory cells. The memory cells can also be indexed such that there can be a first memory cell with a lowest index and a last memory cell with a highest index. The indexes associated with the memory cells can be consecutive numbers beginning with a lowest index and continuing to a highest index. In some examples, the indexes associated with the memory cells can be independent from the addresses associated with the memory cells. In other examples, the indexes associated with the memory cells can correspond with the addresses associated with the memory cells. For example, a lowest index assigned to a memory cell can correspond with a lowest address of the memory cell.

The queue 112 can be an ordered queue comprising priority information and event information. For example, the queue 112 can store event information and priority information. The queue 112 can also store event information and can include priority information in the structure of the queue 112.

For example, each of the memory cells can store a predefined logical value. The memory cells can store a logical "0" or a logical "1". Each of the memory cells can be associated with a different one of a plurality of events. For example, a first memory cell can be associated with a first event, a second memory cell can be associated with a second event, a third memory cell can be associated with a third event, etc. Also, the first memory cell can identify an event with a highest priority, a second memory cell can identify an event with a second highest priority, and a third memory cell can identify an event with a third highest priority.

Accordingly, the first memory cell storing a predefined logical value (e.g., logical "1") can identify a first event that has a highest priority, a second memory cell storing the predefined logical value can identify a second event that has a second highest priority, a third memory cell storing the predefined logical value can identify a third event that has a third highest priority, etc.

The queue 112 can store data associated with multiple different events at a same time. For example, multiple memory cells in the queue 112 can store a predetermined value (e.g., logical "1") to store event data for multiple events. The memory cells storing the predetermined values can also have a built-in priority as each of the memory cells can have a predefined priority based on their corresponding indexes and/or address. Linking a priority to an index and/or address of a memory cell can have benefits over other prioritization schemes. For example, a first-in first-out (FIFO) and/or a last-in first out (LIFO) prioritization scheme can be limiting given that a priority is assigned to an event at a time that the event is added to the queue 112. In some instances, it may be beneficial to predefine priority instead of assigning priority when an event is added to the queue 112 as will be explain in FIG. 2.

The core FW 108 can retrieve events from the queue 112. The core FW 108 can retrieve events based on a priority associated with the events. For example, the core FW 108 can retrieve a first event with a highest priority during a first retrieval and a second event with a highest priority during a second retrieval. In some examples, the first event can have a higher priority than a priority associated with the second event. The first event can also have a lower priority than a priority of the second event. The first event can further have a same priority than a priority of the second event.

The first event can have a lower priority or a same priority than a priority of the second event due to the addition of events to the queue between the first retrieval and the second retrieval. For example, the second event can be added to the queue 112 after a first retrieval and before the second retrieval such that the second event was not available to be retrieved from the queue 112 during the first retrieval. The ability to add events to the queue 112 in between retrievals based on a priority that is assigned prior to the addition of the events to the queue 112 allows for the addition of events to the queue 112 with higher priorities than events already stored in the queue 112.

As used herein, storing events to the queue 112 can refer to storing event data in the queue 112. For example, event data can comprise an event identifier in the queue 112, an object in the queue 112, and/or information associated with the event in the queue 112. Storing the event identifier in the queue 112 can include storing a logical "1" in a memory cell reserved for events with the event identifier. For example, events of a first type can be stored in a first memory cell with a first index by storing a logical "1" in the first memory cell while events of a second type can be stored in a second memory cell with a second index by storing a logical "1" in the second memory cell.

The core FW 108 can retrieve the events from the queue 112 without further interaction with the binary library 110. For example, the core FW 108 can retrieve the events from the queue 112 by reading the memory cells of the queue 112 without utilizing the interface library 114 and/or the binary library 110. The core FW 108 can also reset the memory cells without utilizing the interface library 114. In some examples, the core FW 108 may not add events to the queue 112 without interacting with the interface library 114 and/or the binary library 110. The core FW 108 can read data and delete data from the queue 112 through the API 116.

Although not shown, the queue 112 can further be manipulated by an apparatus that is controlled by the core FW 108. For example, the queue 112 can be manipulated by a controller and the binary library 110. The controller can be controlled by the core FW 108 to remove events from the queue 112 while the binary library 110 can add events to the queue 112.

The core FW 108 can retrieve events from the queue 112 by polling into this queue 112 periodically to determine whether there are events to be retrieved from the queue 112. Events can include system control interrupt (SCI) events. For example, the events can include SCI events to pop-up a message for an OS application, shutdown down a system (computing device), shutdown and turn on a system, and/or call specific functions, among other SCI events.

Providing the binary library 110 as a hidden layer utilizing the interface library 114 allows the events to be added to the queue 112 without providing details of how the events are added to the queue 112 or even which events are added to the queue 112. Also, since events are handled by the core FW 108, the events can be handled without conflicting with features in the core FW 108.

Providing the binary library 110 as a hidden layer simplifies development of the binary library 110. The binary library 110 can be relieved of handling of the events by passing responsibility of handling of the events to the queue 112.

Figure 2:
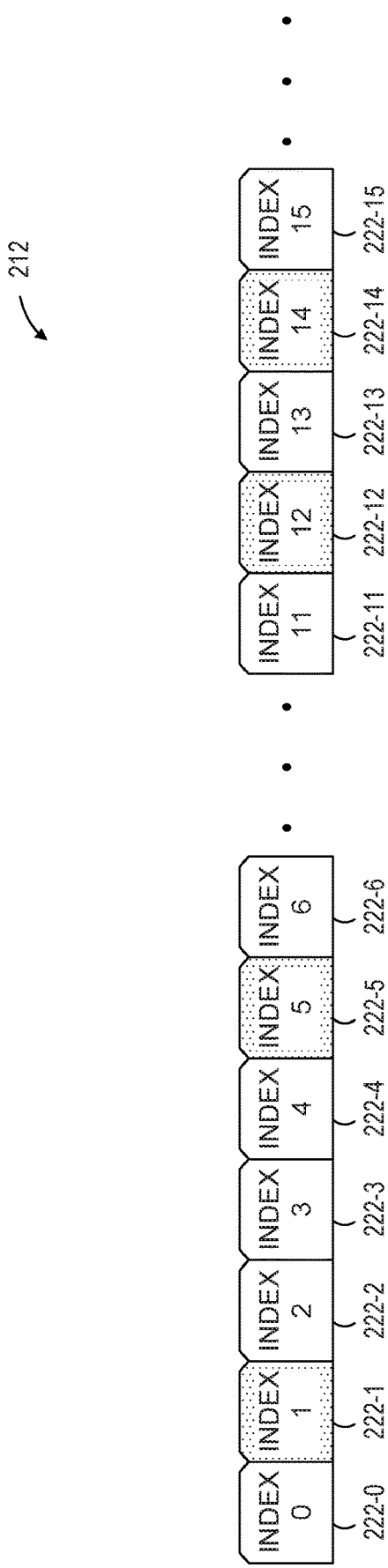
FIG. 2 illustrates an example of a queue consistent with the disclosure.

FIG. 2 illustrates an example of a queue 212 consistent with the disclosure. The queue 212 comprises memory cells 222-0 to 222-63 (the memory cells 222-16 to 222-63 are not shown) which can be referred to as memory cells 222.

Each of the memory cells 222 can be assigned an index. For example, the first memory cell 222-0 can have a first index (e.g., index 0), the second memory cell 222-1 can have a second index (e.g., index 1), the third memory cell 222-2 can have a third index (e.g., index 2), the fourth memory cell 222-3 can have a fourth index (e.g., index 3), the fifth memory cell 222-4 can have a fifth index (e.g., index 4), the sixth memory cell 222-5 can have a sixth index (e.g., index 5), the seventh memory cell 222-6 can have a seventh index (e.g., index 6), ..., the twelfth memory cell 222-11 can have a twelfth index (e.g., index 11), the thirteenth memory cell 222-12 can have a thirteenth index (e.g., index 12), the fourteenth memory cell 222-13 can have a fourteenth index (e.g., index 13), the fifteenth memory cell 222-14 can have a fifteenth index (e.g., index 14), and the sixteenth memory cell 222-15 can have a sixteenth index (e.g., index 15), among other indexes that can be assigned to the memory cells 222.

Although the examples shown in FIG. 2 includes the queue 212 as having 64 of the memory cells 222, the queue 212 can include a different number of memory cells. For example, the queue 212 can include 8 memory cells, 16 memory cells, 32 memory cells, or 128 memory cells. In other examples, the queue 212 can include a different number of memory cells than those described herein.

The number of memory cells comprising the queue 212 can be correlated to the events that can be stored in the queue 212. For example, if 8 events, 16 events, 32 events, 64 events, or 128 events can be stored in the queue 212, then 8 memory cells, 16 memory cells, 32 memory cells, 64 memory cells, or 128 memory cells can comprise the queue 212, respectively.

Each type of event stored in the queue 212 can be assigned a unique priority. As such, each event can have a predefined priority as compared to other events with different event types. Each memory cell from the memory cells 222 can store a different event type. Accordingly, each memory cell can be associated with a different priority based on the type of event that the memory cells 222 store. The priorities of the memory cells 222 can be directly correlated to the index and/or the address associated with the memory cells 222.

In some examples, memory cells with lower indexes can be associated with higher priorities as compared to priorities which are associated with lower indexes. In such a priority scheme, the memory cell 222-0 can store events that have priority over events stored in the memory cell 222-1. The memory cell 222-1 can store events that have priority over events stored in the memory cells 222-2. The memory cell 222-11 can store events that have priority over events stored in the memory cell 222-12. The memory cell 222-12 can store events that have priority over events stored in the memory cells 222-13.

In other examples, memory cells with higher indexes can be associated with higher priorities as compared to priorities which are associated with lower indexes. In such a priority scheme, the memory cell 222-2 can store events that have priority over events stored in the memory cell 222-1. The memory cell 222-1 can store events that have priority over events stored in the memory cells 222-0. The memory cell 222-13 can store events that have priority over events stored in the memory cell 222-12. The memory cell 222-12 can store events that have priority over events stored in the memory cells 222-11. In yet other examples, the memory cells 222 can be associated with a different priority scheme other than a FIFO or a LIFO prioritization scheme.

In FIG. 2, the shaded memory cells 222-1, 222-5, 222-12, and 222-14 identify memory cells that are set. A memory cell can be set when the memory cell stores a predefined value such as a logical "1" or a logical "0". Clear memory cells (e.g., memory cells other than memory cells 222-1, 222-5, 222-12, and 222-14) identify memory cells that have not been set.

It may be beneficial to predefine priority, as described herein, instead of assigning priority at the time an event is added to the queue 112 to reduce the quantity of memory cells used to store events, and/or event data. For example, decoupling a priority from the indexes and/or addresses associated with the memory cells 222 can include utilizing more memory cells to store a priority associated with a given event. Accordingly, storing an event can include storing data in more than a single memory cell.

In some examples, two or more memory cells from the memory cells 222 can be associated with a same event type. For example, the memory cell 222-2 and the memory cell 222-3 can store a same event type. A first event with the event type can be stored in the memory cell 222-2 before a second event with the event type can be stored in the memory cell 222-3. Accordingly, the first event can be retrieved from the memory cell 222-2 before the second event is retrieved from the memory cell 222-3. As such, the queue 212 can store events based on predetermined priorities and based on priorities assigned at a time the events are stored in the queue 212 if multiple events of a same event type are stored concurrently in the queue 212.

The binary library can set a number of bits in the memory cells 222 after one or more security violations are found and data associated with said security violations is provided to the binary library. For example, the binary library can store bits in the memory cells 222-1, 222-5, 222-12, and 222-14 based on receiving data associated with the one or more security violations.

The binary library can generate a number of events comprising a pop-up message event, a heavy/slow event, an event retrieval timing event, and a shutdown event. In the examples provide in FIGS. 2 and 3, pop-up message events can have priority over heavy/slow events. The heavy/slow events can have priority over event retrieval timing events. Event retrieval timing events can have priority over shutdown events. The pop-up message event can be stored in the queue 212 by storing a bit in the memory cell 222-1. The heavy/slow event can be stored in the queue 212 by storing a bit in the memory cell 222-5. The retrieval timing event can be stored in the queue 212-12. The shutdown event can be stored in the queue 212 by storing a bit in the memory cell 222-14.

As used herein, the pop-up message event can be processed by the core FW to cause a system to display a message. The heavy/slow event can be processed by the core FW to provide a duration of time to perform a number of activities/operations including logging the security violation to non-volatile random-access memory (NVRAM). For example, an interrupt service routine (ISR) can be generated when a watchdog timer expires. The ISR may not perform heavy/slow operations. The ISR can add the event to the event queue 212 through the EC, the core FW, and the binary library to provide an opportunity to perform the heavy/slow operations at a later time.

The event retrieval timing event can be processed by the core FW to delay a retrieval of a next event from the queue 212. The shutdown event can be processed by the core FW to shut down a system. The queue 212 is used to describe the example shown in FIG. 3.

Figure 3:
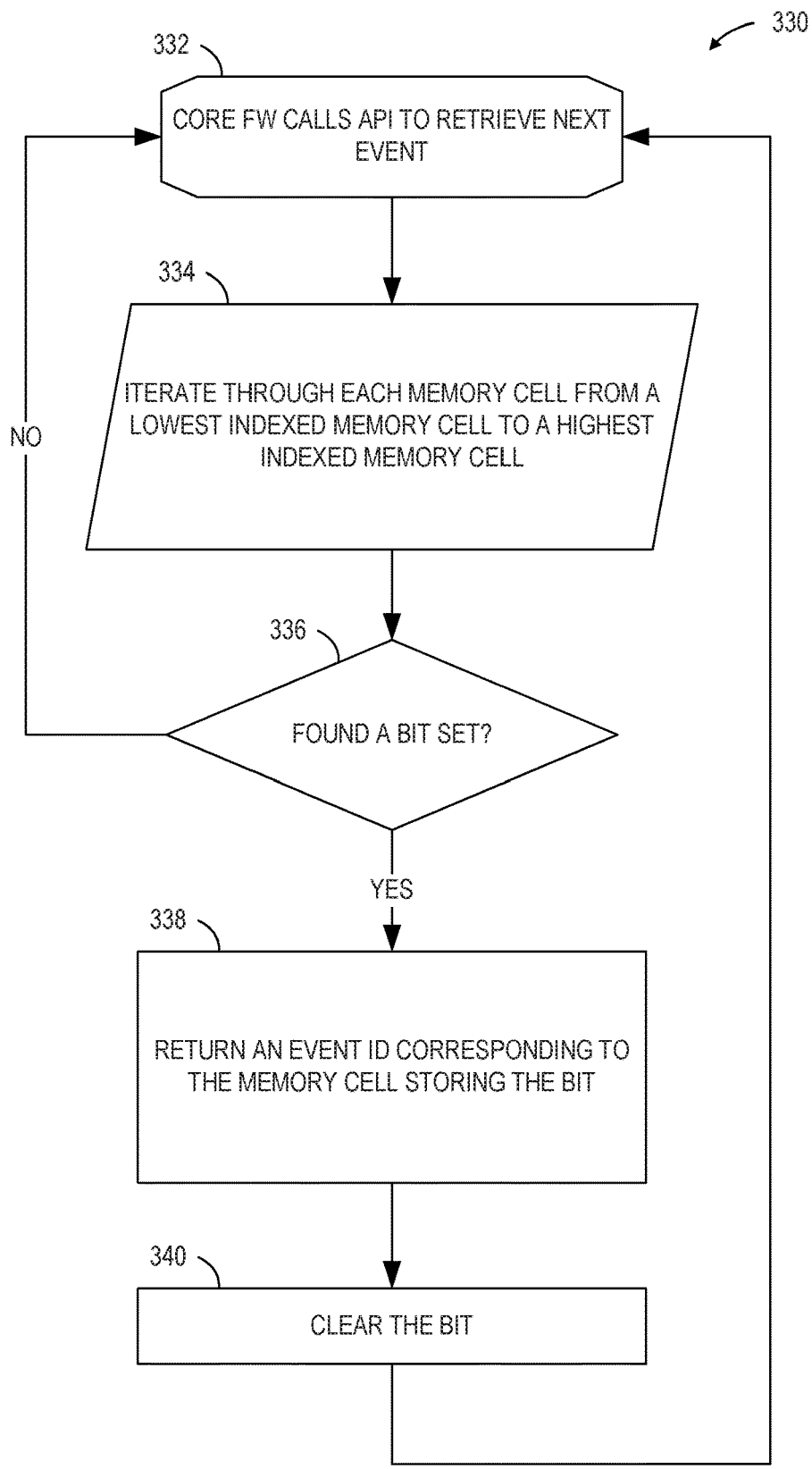
FIG. 3 illustrates an example flow diagram for processing events in a queue.

FIG. 3 illustrates an example flow diagram 330 for processing events in a queue consistent with the disclosure. The flow diagram 330 can be used by a core FW to retrieve events from a queue (e.g., the queue 212 in FIG. 2).

At 332, the flow diagram 330 can include calling, from the core FW, an API to retrieve a next event. The API used to retrieve a next event can include objects, methods, and/or calls used to access the queue and/or manipulate the queue. Describing that the core FW performs an operation and/or an action can include a description that the core FW performs an operation and/or an action through the API.

At 334, the API can iterate through each memory cell from a lowest indexed memory cell to a highest indexed memory cell. For example, the API can iterate through the memory cells 222 from the memory cell 222-0 to the memory cell 222-63 in FIG. 2.

At 336, the API can determine whether a bit is set in a given memory cell. A bit can be set in a memory cell when the memory cell stores a predetermine value such as a logical "1". Setting a bit in a memory cell can include setting the memory cell.

During a first iteration of the flow diagram 330, the core FW via the API, can iterate through the memory cells 222-0 and 222-1 and determine that a bit is not set in the memory cell 222-0 and that a bit is set in the memory cell 222-1. At 338, the API can return an event ID corresponding to the memory cell 222-1 storing the bit to the core FW. The core FW can identify an index associated with the memory cell 222-1. Based on the index, the core FW can identify an event ID corresponding to the memory cell 222-1 and/or the index. The core FW can generate the event from the event ID. At 340, the core FW can clear the bit from the memory cell 222-1. For example, the event ID can identify the pop-up message event. Accordingly, the core FW can generate and/or process the pop-up message event to display a message on the system. Upon clearing the memory cell 222-1, the core FW can call the API to retrieve the next event at 332.

During a second iteration of the flow diagram 330 and at 334, the core FW can iterate through the memory cells 220-0 to 220-5. The core FW can determine that a bit is not set in the memory cells 220-0, 220-1, 220-2, 220-3, and 220-4. The core FW can determine that a bit is set in the memory cell 220-5.

During the second iteration and at 338, the API can return an event ID corresponding to the memory cell 220-5 storing the bit to the core FW. The event ID can identify the heavy/slow event. Accordingly, the core FW can generate and/or process the heavy/slow event to log the security violation. At 340, the core FW can clear the bit in the memory cell 220-5. Said differently, the core FW can clear the memory cell 220-5.

During a third iteration and at 332, the core FW can call an API to retrieve a next event. During the third iteration of the flow diagram 330 and at 334, the core FW can iterate through the memory cells 220-0 to 220-12. The core FW can determine that a bit is not set in the memory cells 220-0 to 220-11. The core FW can determine that a bit is set in the memory cell 220-12.

During the third iteration and at 338, the API can return an event ID corresponding to the memory cell 220-12 storing the bit to the core FW. At 340, the core FW can clear the bit in the memory cell 220-12.

The event ID can identify the event retrieval timing event. Accordingly, the core FW can generate and/or process the event retrieval timing event to delay a retrieval of an event with a next highest priority. The core FW can delay an event retrieval by a predefined amount of time. For example, the core FW can delay an event retrieval by 30 second. Delaying the event retrieval can allow, for instance, the system to display a message for 30 seconds before the system is shut down.

During a fourth iteration and at 332, the core FW can call an API to retrieve a next event. During the fourth iteration of the flow diagram 330 and at 334, the core FW can iterate through the memory cells 220-0 to 220-14. The core FW can determine that a bit is not set in the memory cells 220-0 to 220-13. The core FW can determine that a bit is set in the memory cell 220-14.

During the fourth iteration and at 338, the core FW can return an event ID corresponding to the memory cell 220-14 storing the bit. The event ID can identify the shutdown event. Accordingly, the core FW can generate and/or process the shutdown event to shut down the system. At 340, the core FW can clear the bit in the memory cell 220-14.

During a fifth iteration and at 332, the core FW can call an API to retrieve a next event. During the fifth iteration of the flow diagram 330 and at 334, the core FW can iterate through the memory cells 220-0 to 220-63. The core FW can determine that a bit is not set in the memory cells 220-0 to 220-63.

The flow diagram 330 can continue to perform additional iterations to determine whether additional events have been added to the queue 212. In some examples, the core FW can wait a predetermined amount of time between iterations of the flow diagram 330. For example, the predetermined amount of time can include a duration of time such as 50 milliseconds (ms). Said differently, the core FW can call the API to retrieve a next event no sooner than every 50 ms. As such, the core FW may have access to a counter to determine whether 50 ms have transpired since a last call to the API.

In some examples, the API can be executed at the core FW or the API can be executed at a different apparatus of the core FW. For example, the EC can include an apparatus coupled to the queue 112 and the core FW. The apparatus can receive commands from the core FW to perform a number of operations and/or actions on the queue.

The core FW can generate one or more SCIs in response to processing an event. For example, the core FW can generate a first SCI to display the message to the system, a second SCI to log the security violation, and a third SCI to shut down the system. The core FW can provide the SCIs to the OS through the chipset.

The examples shown in FIG. 3 include a prioritization scheme comprising higher priorities for lower indexed memory cells. As such, the iteration of the memory cells occurs from a lowest indexed memory cell to a highest indexed memory cell. Given a prioritization scheme that prioritizes higher indexed memory cells over lower indexed memory cells, the timing diagram 330 can iterate through the memory cells from a highest indexed memory cell to a lowest indexed memory cell.

Figure 4:
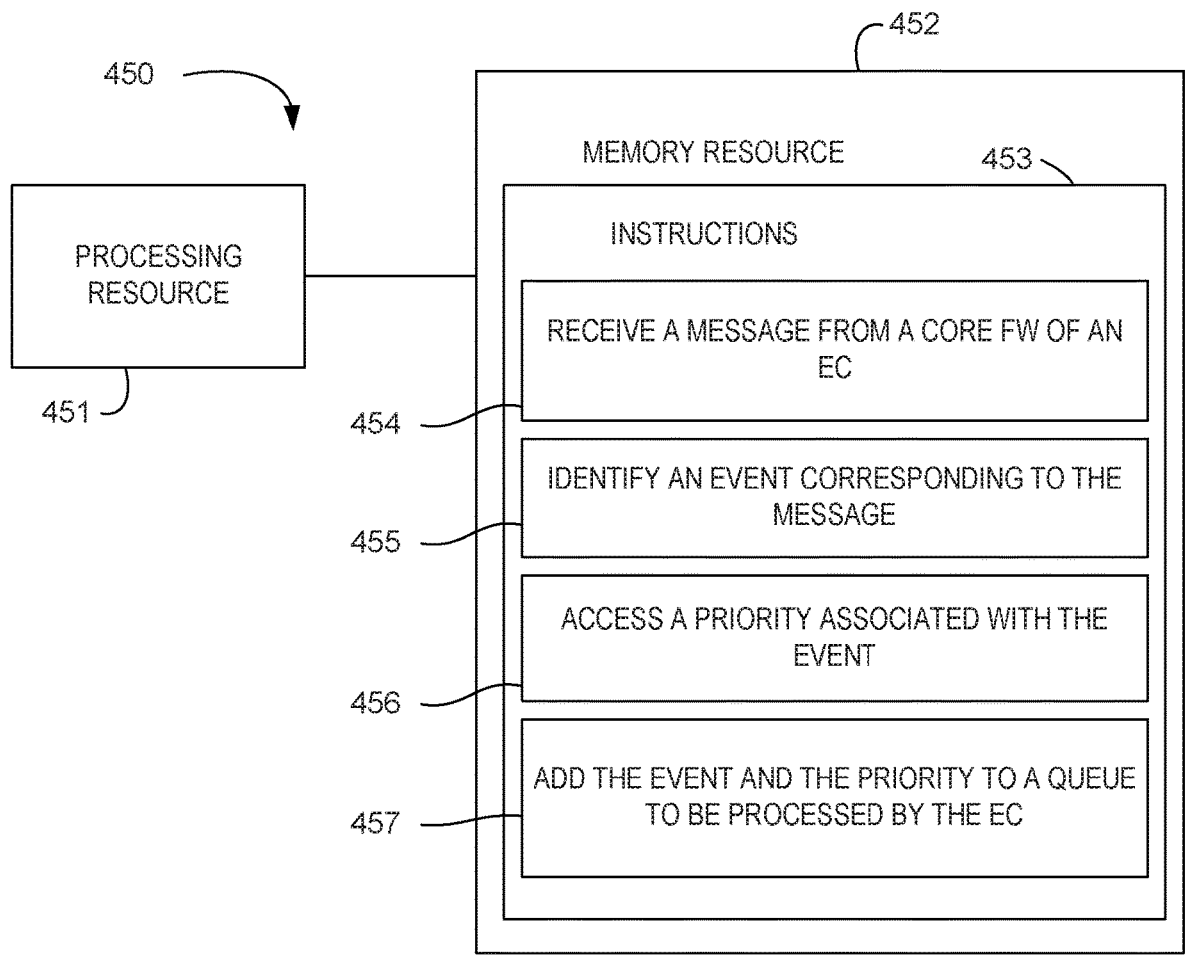
FIG. 4 illustrates an example of an apparatus for handling controller events using a queue residing in an EC.

FIG. 4 illustrates an example of an apparatus 450 for handling controller events using a queue residing in an EC. As shown in FIG. 4, the apparatus 450 includes a processing resource 451 and a memory resource 452.

The processing resource 451 may be a hardware processing unit such as a microprocessor, application specific instruction set processor, coprocessor, network processor, or similar hardware circuitry that can cause machine-readable instructions to be executed. In some examples, the processing resource 451 may be a plurality of hardware processing units that can cause machine-readable instructions to be executed. The processing resource 451 can include central processing units (CPUs) and/or graphics processing units (GPUs), among other types of processing units. The memory resource 452 may be any type of volatile or non-volatile memory or storage, such as random access memory (RAM), flash memory, read-only memory (ROM), storage volumes, a hard disk, or a combination thereof.

The memory resource 452 may store instructions 453 thereon. When executed by the processing resource 451, the instructions 453 may cause the apparatus 450 to perform specific tasks and/or functions. For example, at block 454, the memory resource 452 may store instructions 453 which may be executed by the processing resource 451 to cause the apparatus 450 to receive a message from a core FW of an EC. At block 455, the memory resource 452 may store instructions 453 which may be executed by the processing resource 451 to cause the apparatus 450 to identify an event corresponding to the message. At block 456, the memory resource 452 may store instructions 453 which may be executed by the processing resource 451 to cause the apparatus 450 to access a priority associated with the event. At block 457, the memory resource 452 may store instructions 453 which may be executed by the processing resource 451 to cause the apparatus 450 to add the event and the priority to a queue to be processed by the EC.

The instructions 453 executed by the processing resource 451 to access a predefined priority that corresponds to the event. The queue can be a bit array comprising a plurality of memory cells. Each of the memory cells can store a bit. An index of a given memory cell can be used to identify a priority of an event associated with the given memory cell. As such, the binary library (e.g., processing resource associated with the binary library) can identify the index of the queue that is reserved for the event. The binary library can identify the index to determine what type of event is associated with the memory cell having the index. The binary library can add the event to a memory cell comprising the index associated with the event. Each index corresponding to a different one of the plurality of memory cells is reserved for a different event from a plurality of events including the vent. A plurality of indexes can be assigned to the plurality of memory cells, wherein the plurality of indexes are associated with a plurality of events including the event.

In some examples, the binary library can identify a plurality of events from the data provided the message. The plurality of events can include the event.

Figure 5:
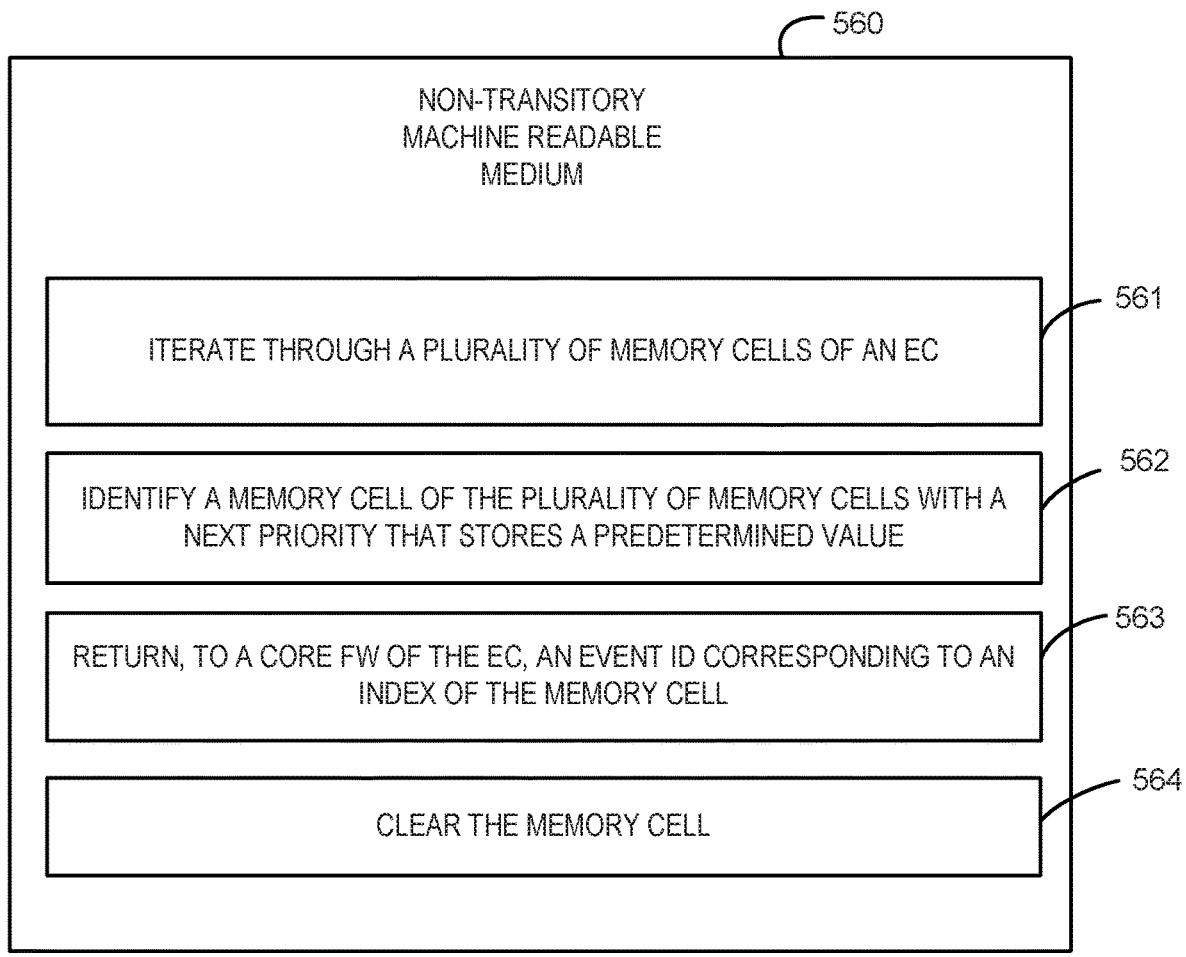
FIG. 5 illustrates an example non-transitory machine-readable medium for handling controller events using a queue residing in an EC.

FIG. 5 illustrates an example non-transitory machine-readable medium 560 for handling controller events using a queue residing in an EC. A processing resource may execute instructions stored on the non-transitory machine readable medium 560. The non-transitory machine readable medium 560 may be any type of volatile or non-volatile memory or storage, such as random access memory (RAM), flash memory, read-only memory (ROM), storage volumes, a hard disk, or a combination thereof.

The example medium 560 stores instructions 561 executable by a processing resource to iterate through a plurality of memory cells of an EC. The example medium 560 stores instructions 562 executable by a processing resource to identify a memory cell of the plurality of memory cells with a next priority that stores a predetermined value. The example medium 560 stores instructions 563 executable by the processing resource to return, to a core FW of the EC, an event ID corresponding to an index of the memory cell. The example medium 560 stores instructions 564 executable by the processing resource to clear the memory cell.

The instructions 561 to iterate through the plurality of memory cells further comprise instructions to iterate from a lowest indexed memory cell of the plurality of memory cells to a highest indexed memory cell of the plurality of memory cells. In other examples, Iteration through the plurality of memory cells can also include iterating from a highest indexed memory cell of the plurality of memory cells to a lowest indexed memory cell of the plurality of memory cells. The index can be an address of the memory cell or a different identifier associated with the memory cell. A predetermined value stored in the memory cell can be a logical "1" or a logical "0". As such and in one instance, the memory cell can be activated by storing a logical "1" to store an event in the memory cell. Accordingly, clearing the memory cell can include storing a logical "0" in the memory cell. In other examples, the memory cell can be activated by storing a logical "0" to store the event in the memory cell. Clearing the memory cell can include storing a logical "1" in the memory cell.

A plurality of event IDs, including the event ID, can be uniquely correlated to a different one of the plurality of memory cells. Events of an event type can be assigned an event ID and can be stored in a predefined memory cell. For example, message events can be assigned and event ID "ME" and can be stored in a memory cell with a second index. Other events may not be storable in the memory cell with the second index until a different relationship is established between the event ID and the index associated with the memory cell.

The event ID can be generated based on receiving instructions at the API and from the core FW to generate the event ID. Generating the event ID can include determining that a memory cell stores a predefined value and generating the event ID based on the index of the memory cell.

The instructions 561 to identify the memory cell with the next priority further comprise instructions to identify a memory cell with a next highest priority that stores the predetermined value. That is, each time a memory cell is identified as storing the predetermined value, the API can iterate through the memory cells having a lower index than the memory cell that stores the predetermined value.

Figure 6:
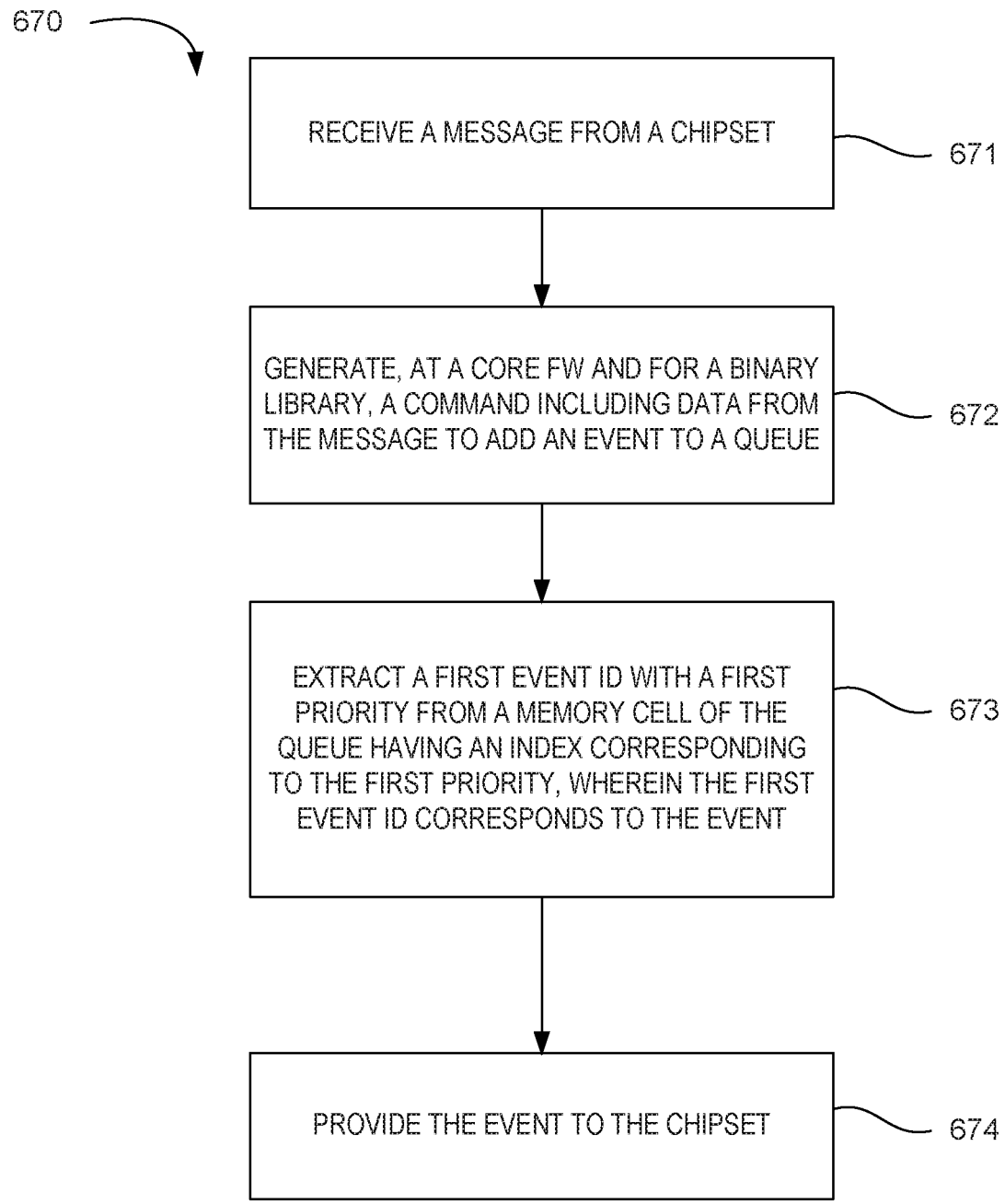
FIG. 6 illustrates an example flow diagram of a method for handling controller events using a queue residing in an EC.

FIG. 6 illustrates an example flow diagram of a method 670 for handling controller events using a queue residing in an EC. At block 671, the method 670 includes receiving a message from a chipset. At block 672, the method 670 includes generating, at a FW and for a binary library, a command including data from the message to add an event to a queue. At block 673, the method 670 includes extracting a first event ID with a first priority from a memory cell of the queue having an index corresponding to the first priority, wherein the first event ID corresponds to the event. At block 674, the method 670 includes providing the event to the chipset.

The method 670 further comprises providing an interrupt corresponding to the vent to the chipset. The method 670 can also include extracting a second event ID with a second priority from the queue, wherein the second event ID corresponds to a different event generated from the command and the data. The first priority is associated with the index and the second priority is associated with a different index, and wherein the index is smaller than the different index.

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the disclosure. As used herein, designators such as "N", etc., particularly with respect to reference numerals in the drawings, indicate that a number of the particular feature so designated can be included. A "plurality of" is intended to refer to more than one of such things.

What is claimed:

1. An apparatus comprising:
a memory; and
a processor executing to execute instructions stored in the memory to:
receive a message from a core firmware (FW) of an embedded controller (EC);
identify an event corresponding to the message;
access a priority associated with the event;
add the event to occupy a memory cell of a plurality of memory cells used for a queue to be processed by the EC, wherein an index of the memory cell identifies the priority associated with the event; and
iterate through the plurality of memory cells based on the index of the plurality of memory cells to identify a first occupied memory cell, wherein the first occupied memory cell includes a highest priority event of the plurality of memory cells.

2. The apparatus of claim 1, wherein the processor is to execute instructions to access a predefined priority that corresponds to the event.

3. The apparatus of claim 1, wherein the plurality of memory cells include a predefined priority based on a corresponding address of the plurality of memory cells.

4. The apparatus of claim 1, wherein the processor is to execute instructions to identify the index of the queue that is reserved for the event.

5. The apparatus of claim 1, wherein the processor is to execute instructions to assign a plurality of indexes to the plurality of memory cells, wherein the plurality of indexes are associated with a plurality of events including the event.

6. A non-transitory machine-readable medium storing instructions executable by a processing resource to:
iterate through a plurality of memory cells of an embedded controller (EC) based on an index of the plurality of memory cells to identify a first occupied memory cell, wherein the first occupied memory cell includes a highest priority event of the plurality of memory cells and a last occupied memory cell includes a lowest priority event;
identify a memory cell of the plurality of memory cells with a next priority that stores a predetermined value;
return, to a core firmware (FW) of the EC, an event identifier (ID) of an event to be executed by the FW corresponding to an index value of the first occupied memory cell, wherein the index value of the first occupied memory cell identifies the event and the priority associated with the event; and
clear the first occupied memory cell.

7. The non-transitory machine-readable medium of claim 6, wherein the instructions to iterate through the plurality of memory cells further comprise instructions to iterate from a lowest indexed memory cell of the plurality of memory cells to a highest indexed memory cell of the plurality of memory cells.

8. The non-transitory machine-readable medium of claim 6, wherein the instructions to iterate through the plurality of memory cells further comprise instructions to iterate from a highest indexed memory cell of the plurality of memory cells to a lowest indexed memory cell of the plurality of memory cells.

9. The non-transitory machine-readable medium of claim 6, wherein the index is an address of the memory cell.

10. The non-transitory machine-readable medium of claim 6, wherein each of a plurality of event IDs, including the event ID, is uniquely correlated to a different one of the plurality of memory cells.

11. The non-transitory machine-readable medium of claim 6, further comprises instructions to receive a command from the core FW to generate the event ID.

12. A method to generate an event at an embedded controller (EC), comprising:

receiving a message from a chipset;

generating, at a core firmware (FW) and for a binary library, a command including data from the message to add an event to a queue, wherein the event is stored in a memory cell of a bit array of a plurality of memory cells and, wherein an index of each of the plurality of memory cells identifies a predefined priority of the event stored in the memory cell;

iterate through the bit array of the plurality of memory cells based on the index of the plurality of memory cells to identify a first occupied memory cell, wherein the first occupied memory cell includes a highest priority event of the plurality of memory cells and a last occupied memory cell includes a lowest priority event;

extracting a first event identifier (ID) with a first priority from the first occupied memory cell of the queue having an index from a memory cell of a plurality of memory cells, wherein the first event ID corresponds to the event, wherein the index of the memory cell identifies the first priority associated with the event; and providing the event to the chipset.

13. The method of claim 12, further comprising providing an interrupt corresponding to the event to the chipset.

\* \* \* \* \*